D. GUSWEILER.
Hot-Air Furnace.
No. 91,436.
Patented June 15, 1869.
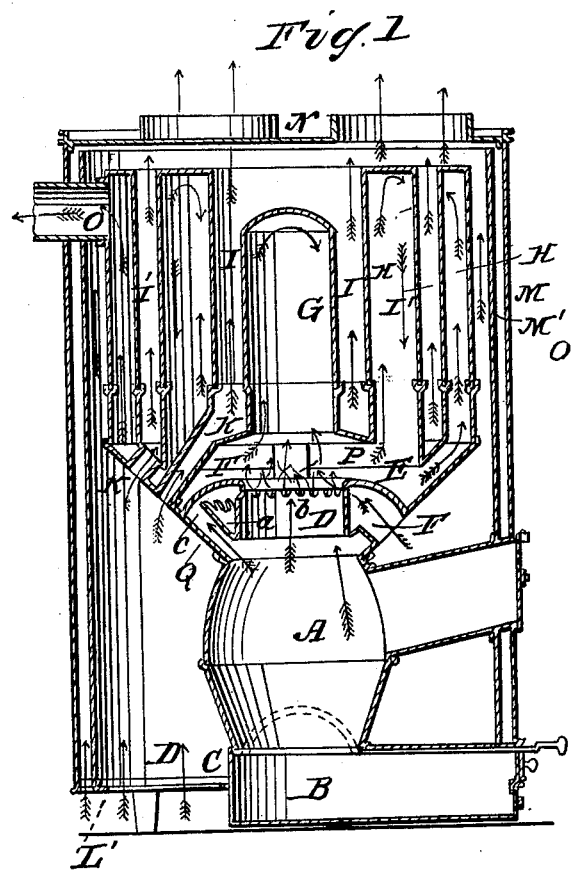
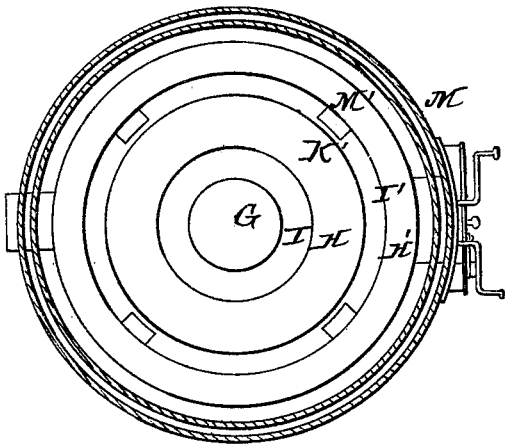
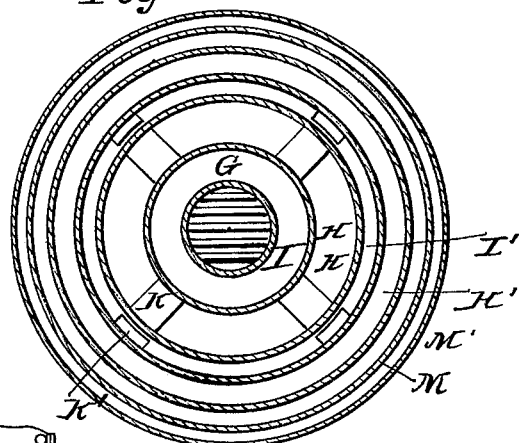
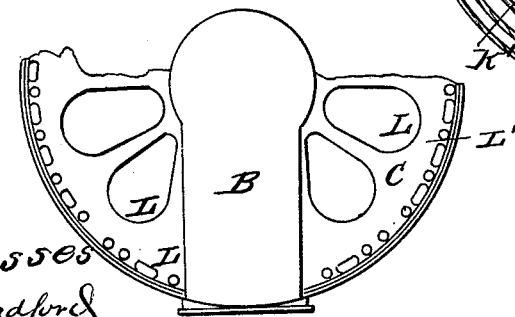
Witnesses
Thos. Bradford
C. L. Fisher
Inventor
Daniel Gusweiler

United States Patent Office.

DANIEL GUSWEILER, OF CINCINNATI, OHIO, ASSIGNOR TO HIMSELF AND JACOB HOFFNER, OF SAME PLACE.

Letters Patent No. 91,436, dated June 15, 1869.

HOT-AIR FURNACE.

The Schedule referred to in these Letters Patent and making part of the same.

*To all whom it may concern:*

Be it known that I, DANIEL GUSWEILER, of Cincinnati, in the county of Hamilton, and State of Ohio, have invented a new and useful Improvement in Warm-Air Furnaces; of which the following is a full and clear description, reference being had to the accompanying drawings, making part of this specification.

The nature of my improvement in furnaces consists in the provision of a perforated annular distributing-box, located immediately above the fire-pot, and so arranged, with reference to it, and a concave diaphragm connected with it, that the hot gases evolved in the combustion may mingle with facility with fresh air entering from without, increasing the combustion already commenced.

And also, in the construction and arrangement of a series of combustion-chambers, located within the outer casings of the furnace, and above the fire-pot.

Figure 1 is a vertical section of my improved furnace, taken through the furnace-door and the smoke-flue.

Figure 2 is a plan of the same, the top-plate being removed.

Figure 3 is a horizontal section of the furnace, through all the combustion-chambers, immediately above the distributing-box.

Figure 4 represents a plan of a part of the bottom-plate of the furnace.

A is the fire-pot, located centrally within the casings of the furnace. It rests upon the deep ash-box B, which is secured to the base-plate C.

The distributing-box D, above the fire-pot A, is a short cylindrical hoop-shaped body, provided with a conical flange, a, at its base, which flares upwards.

The upper edges of the distributing-box and conical flange are perforated at b and c, where said edges come in contact with the concave diaphragm E. This diaphragm is open in the centre.

F is a pipe, of which there is a number, for admitting air to the distributing-chamber or box.

G is the central combustion-chamber, having a domed top. It is surrounded by a number, two in this representation, of annular combustion-chambers, H H'.

The spaces I and I', between the chambers H H', are constantly supplied with fresh air, which enters them through the pipes K K'.

The air from without the furnace enters through the perforations L L', in the base-plate C. The current of air passing through the perforations L is continued up between the outer and inner casings, M M', of the furnace.

The outer casing is the longest, and is covered with a top-plate, N, provided with the desirable number of openings for conveying off the warm air.

O is the smoke-flue, connecting with the combustion-chamber H near its top.

A concave diaphragm, P, connects the central combustion-chamber G with the inner annular chamber H.

Q is a conical plate, extending from the top of the fire-pot to the lower and outer edge of the combustion-chamber H. It is perforated for the admission of fresh air into the spaces between the combustion-chambers.

It is believed that a furnace constructed as herein described will effect, in a manner not yet accomplished in furnaces in general use, the thorough combustion of the gases evolved in the fire-place, by admitting currents of air through the perforations $b$ and $c$, in the upper edges of the distributing-box D, which, crossing at all angles the highly-heated hydrogenous gases, a complete combustion of course ensues, heating the central combustion-chamber, and also the annular chambers H H exterior to it. The impure gases finally escape through the smoke-flue O.

The surfaces of the combustion-chambers G, H H' radiate the heat into the spaces I I', the air is heated, and passes upwards and out of the furnace, by means of the warm-air pipes connected with the top-plate N.

What I claim as new, and desire to secure by Letters Patent, is—

1. The combination of the fire-pot A, the air-distributer D, and diaphragm E, all constructed and arranged to operate as described.

2. The arrangement of the combustion, or heat-chambers, G, H, and H', and the air-chambers I, I', and M', with the perforated base C, all as herein shown and described.

DANIEL GUSWEILER.

Witnesses:
 THOS. BRADFORD,
 O. L. FISHER.